(12) United States Patent
Benson

(10) Patent No.: US 6,203,764 B1
(45) Date of Patent: Mar. 20, 2001

(54) VACUUM-INSULATED CATALYTIC CONVERTER

(75) Inventor: David K. Benson, Golden, CO (US)

(73) Assignee: Midwest Research Institute, Kansas City, MO (US)

( * ) Notice: Subject to any disclaimer, the term of this patent is extended or adjusted under 35 U.S.C. 154(b) by 0 days.

(21) Appl. No.: 09/232,286

(22) Filed: Jan. 15, 1999

(51) Int. Cl.⁷ .................................................... F01N 3/28
(52) U.S. Cl. .................... 422/179; 422/171; 422/177; 422/180
(58) Field of Search ................... 422/171, 177, 422/179, 180, 221, 222; 60/299, 300, 303, 297

(56) References Cited

U.S. PATENT DOCUMENTS 5,477,676  12/1995  Benson et al. ........................ 60/274

OTHER PUBLICATIONS

"NREL's Insulated Catalytic Converter Slashes Automotive Air Pollution," NREL Technology Brief (May 1996).
"Reducing Cold–Start Emissions by Catalytic Converter Thermal Management," Burch, Potter, and Keyser, NREL No. 950409, No Date.
"Applications and Benefits fo Catalytic Converter Thermal Management," Burch, Keyser, Colucci, Potter, and Benson, NREL No. 961134 No Date.
"Thermal Analysis and Testing of a Vacuum Insulated Catalytic Converter," Burch, Potter, Keyser, and Benson, NREL No. 941998, Oct. 19, 1994.

*Primary Examiner*—Hien Tran
(74) *Attorney, Agent, or Firm*—Paul J. White

(57) ABSTRACT

A catalytic converter has an inner canister that contains catalyst-coated substrates and an outer canister that encloses an annular, variable vacuum insulation chamber surrounding the inner canister. An annular tank containing phase-change material for heat storage and release is positioned in the variable vacuum insulation chamber a distance spaced part from the inner canister. A reversible hydrogen getter in the variable vacuum insulation chamber, preferably on a surface of the heat storage tank, releases hydrogen into the variable vacuum insulation chamber to conduct heat when the phase-change material is hot and absorbs the hydrogen to limit heat transfer to radiation when the phase-change material is cool. A porous zeolite trap in the inner canister absorbs and retains hydrocarbons from the exhaust gases when the catalyst-coated substrates and zeolite trap are cold and releases the hydrocarbons for reaction on the catalyst-coated substrate when the zeolite trap and catalyst-coated substrate get hot.

16 Claims, 5 Drawing Sheets

VACUUM-INSULATED CATALYTIC CONVERTER

CONTRACTUAL ORIGIN OF THE INVENTION

The United States Government has rights in this invention under Contract No. DE-AC36-98GO10337 between the U.S. Department of Energy and the National Renewable Energy Laboratory, a Division of Midwest Research Institute.

BACKGROUND OF THE INVENTION

1. Field of the Invention

This invention relates generally to catalytic converters in exhaust systems for automobiles and other vehicles and equipment with internal combustion engines and, particularly, to systems for maintaining desired temperature levels and reducing "cold start" emissions in such catalytic converters.

2. State of the Prior Art

Most vehicle exhaust systems and particularly exhaust systems of vehicles powered by gasoline-fueled internal combustion engines are equipped with catalytic converters for reducing noxious emissions in exhaust gases. The most effective current technology catalytic converters comprise ceramic substrates coated with one or more noble metal catalysts, such as platinum, palladium, or rhodium. The preferred noble metal for high temperature hydrocarbon reduction is palladium, and rhodium is effective for improving nitrous oxide and carbon monoxide emissions. So called 3-way catalytic converters typically include combinations of these noble metals that catalyze two oxidation reactions that oxidize carbon monoxide to carbon dioxide and oxidize hydrocarbons to carbon dioxide and water, and, at the same time, that reduce nitrogen oxides to nitrogen and oxygen. These reactions are very effective at certain high temperatures. However, until the catalyst is warmed up to its light-off temperature, defined as the temperature required to oxidize 50% of the hydrocarbons, the effectiveness of catalytic converters is very low. For example, J. C. Summers et al., in their paper "Use of Light-Off Catalysts to Meet the California LEV/ULEV Standards," Catalysts and Emission Technology, Society of Automotive Engineers Special Publication No. 968, Warrendale, Pa., 1993, reported that roughly 60–80% of the tailpipe hydrocarbon emissions occur during the initial cold start phase.

To reach light-off temperature more quickly, it is desirable to retain exhaust heat as much as possible in the catalytic converter, at least until the light-off temperature, usually in the range of about 600°–800° F. (250°–350° C.), is reached. Providing an insulation jacket around the catalytic converter can help to retain heat. However, the temperature of a catalytic converter during extended operation, once the light-off temperature is reached, can continue to rise very rapidly from the exothermic heat of the catalytic reactions with the exhaust gases. If the heat generated during extended operation or from fuel-rich gases reacted in the catalytic converter cannot be dissipated efficiently, it can build up to a point that accelerated aging of the catalyst or even permanent damage to the catalytic converter or to adjacent components or objects can result. Therefore, the maximum desired operating range for a catalytic converter is usually about 1,500° F. (815° C.). Therefore, simply wrapping a catalytic converter with insulation to retain heat for light-off temperature would also have the detrimental effect of retaining too much heat at high temperature levels when the catalytic converter should be dissipating heat to avoid damage.

The U.S. Pat. No. 5,163,289, issued to D. Bainbridge, discloses an insulation jacket around a catalytic converter wherein the insulation is a refractory fiber that conducts heat better at higher temperatures than at lower temperatures, which at least recognized the problem and was a start in a helpful direction. Further, improvements in maintaining heat above light-off temperature for longer times during non-operation periods with a combination of vacuum insulation and phase-change thermal storage material while dissipating heat in high-temperature operation periods with a combination of variable conductance insulation and/or metal-to-metal thermal shunt mechanisms are shown in U.S. Pat. No. 5,477,676, issued to Benson et al. The Benson et al. system disclosed in that U.S. Pat. No. 5,477,676 is effective to store heat and maintain light-off temperatures longer and thereby to reduce "cold start" emissions when it is still hot, such as after short stops of several hours or even several days. Unfortunately, however, it actually exacerbates the "cold start" problem after longer stops when the entire catalytic converter system, including the phase-change thermal storage material, has had time to cool below light-off temperature. In the latter circumstances, upon restarting, not only must the engine exhaust gas reheat the catalyst substrate, it must also reheat the phase-change thermal storage material at the same time to light-off temperature and above, which actually prolongs the "cold start" emissions for substantially longer times than if there was no such heat storage material in the catalytic converter.

Further, even if the heat retention in the catalytic converter during stops could be extended for even longer times by more or better insulation to further minimize the frequency of periods when the temperature does actually fall below light-off temperature, there will still be some occasions for most vehicles when they sit unused long enough for the temperatures of their catalytic converters to fall below light-off temperature. The ensuing periods of high "cold start" emissions are undesirable and may disqualify vehicles equipped with even such improved catalytic converters as those shown in the Benson et al. patent from "ultra-low emissions vehicle" (ULEV) classification. Also, while the electrically heated and controlled hydrogen source getter used in the Benson et al. patent to disable its vacuum insulation and thereby prevent the catalytic converter from overheating is effective for that purpose, it requires complex and expensive wiring, sensors, and control circuits. Such wiring, sensors, and control circuits make the catalytic converter and the vehicle exhaust system vulnerable to failures and increases likelihood of needing repairs and replacements of such equipment with concomitant increases of risks for warranty liabilities.

Therefore, while the Bainbridge and Benson et al. patents and other developments represent significant advancements in "cold start" emissions control with catalytic converters, remaining problems of exacerbated or prolonged "cold start" emissions after circumstances of eventual cool-down below light-off temperature and of active electric wiring, sensors, and control system failures still needed resolutions.

SUMMARY OF THE INVENTION

A general object of this invention, therefore, is to solve the problems encountered with or engendered by the improved catalytic converter of the Benson et al. patent (U.S. Pat. No. 5,477,676) relating to prolonged "cold-start" emissions after cool-down and to complex electric wiring, sensors, and control systems.

A more specific object of this invention is to reduce time required to reach light-off temperature after cold starts in catalytic converters that utilize phase change and other heat storage materials to maintain temperatures above light-off temperature, but which have cooled below light-off temperature.

Another more specific object of this invention is to reduce "cold start" emissions during, the heat-up period that occurs in catalytic converters that are being heated to light-off temperature.

A still further object of this invention is to reduce complexity and potential failure of heat control systems in advanced catalytic converters that utilize heat storage and temperature maintenance and control features to reduce "cold start" emissions from internal combustion and other hydrocarbon fueled engines.

Additional objects, advantages, and novel features of the invention shall be set forth in part in the description that follows, and in part will become apparent to those skilled in the art upon examination of the following, or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described therein, a catalytic converter has an inner canister positioned inside an outer canister to form an annular variable vacuum insulation chamber around the inner canister. One or more catalyst-coated substrates is positioned in the inner canister, which also has an exhaust gases inlet opening and an exhaust gas outlet opening sealed from the annular chamber so that exhaust gases from an internal combustion engine or other source can be conducted through the catalyst-coated substrate for catalytic reaction of pollutants in the exhaust gas. A heat storage structure, for example, an enclosed tank containing a phase change material is positioned in the annular, variable vacuum insulation chamber at a distance spaced apart from the inner canister. A reversible hydrogen getter is also positioned in the annular, variable vacuum insulation chamber, preferably, but not necessarily, on a surface of the heat storage structure, so that the reversible hydrogen getter gets heated and cooled in concert with the heat storage structure. When the heat storage structure and the reversible hydrogen getter are hot, the reversible hydrogen getter desorb hydrogen into the annular, variable vacuum insulation chamber to facilitate heat transfer by gas (hydrogen) conductance from the inner canister, which is heated by hot exhaust geases and by exothermic catalytic reactions of pollutants in the exhaust gases, to the heat storage structure for storage and to the outer canister for dissipation into the ambient atmosphere. However, when the heat storage structure and the reversible hydrogen getter are cool, the reversible hydrogen getter absorbs the hydrogen in the annular, variable insulation chamber so that any heat transfer between the inner canister and the heat storage structure is by radiation, which is not an efficient heat transfer mode at low temperatures. Therefore, initial light-off and heating of the catalyst-coated substrate from a "cold start" is not burdened or slowed by heat drain to the heat storage material. A porous zeolite trap can be positioned between the inlet opening and the catalyst-coated substrates to absorb and retain hydrocarbons from the exhaust gases when the catalyst and zeolite trap are cold and to desorb such hydrocarbons back into the exhaust stream to be catalytically reacted when the catalyst-coated substrate and zeolite trap get heated near or to operating temperature.

BRIEF DESCRIPTION OF THE DRAWINGS

The accompanying drawings, which are incorporated in and form a part of the specifications, illustrate the preferred embodiments of the present invention, and together with the descriptions serve to explain the principles, but not the only structures or process steps for practicing, the present invention.

In the Drawings.

DETAILED DESCRIPTION OF THE PREFERRED EMBODIMENTS

Figure 1:
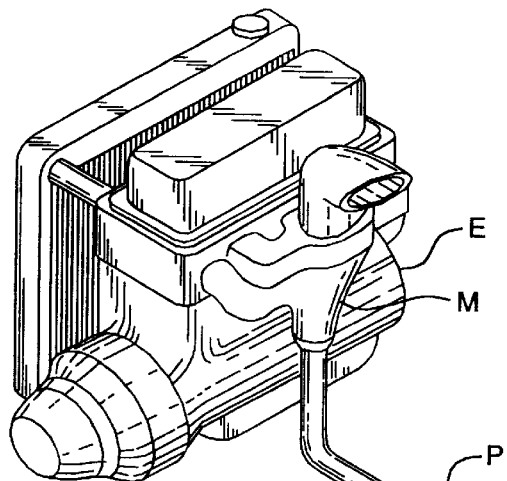
FIG. 1 is an isometric view of the improved vacuum insulated catalytic converter of the present invention mounted in an exhaust system of a typical internal combustion engine.
Figure 3:
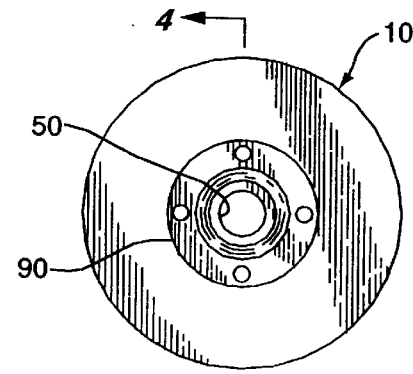
FIG. 3 is a front-end elevation view of the improved vacuum insulated catalytic converter of FIG. 2.
Figure 2:
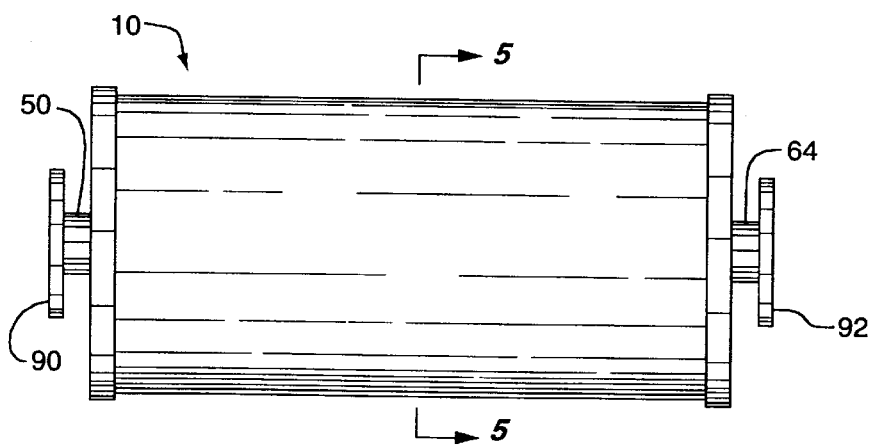
FIG. 2 is a side elevation view of an improved vacuum insulated catalytic converter according to the present invention.

An improved vacuum insulated catalytic converter 10 according to this invention is shown in FIG. 1 mounted in an exhaust pipe P, which is connected to an exhaust manifold M of an internal combustion engine E. In a typical installation, the exhaust pipe P carries exhaust gases from the engine E to the catalytic converter 10, which, when operating, converts poisonous carbon monoxide to less harmful carbon dioxide, hydrocarbons to carbon dioxide and water, and nitrogen oxides to nitrogen and water. The resulting less harmful exhaust gases are then usually conducted by a tail pipe T to a convenient discharge location, usually at the rear or above the top of a motor vehicle (not shown). A muffler (not shown) may also be used downstream from the catalytic converter 10 to muffle exhaust noises. While the improved vacuum insulated catalytic converter 10 of this invention is illustrated in an exhaust system of an internal combustion engine E in a typical motor vehicle arrangement, it can also be used effectively on trucks, tractors, aircraft, mining equipment, marine vessels, industrial engines, gas turbines, or any other application in which carbon monoxide, hydrocarbons, or nitrogen oxides are present in exhaust gases.

Figure 4:
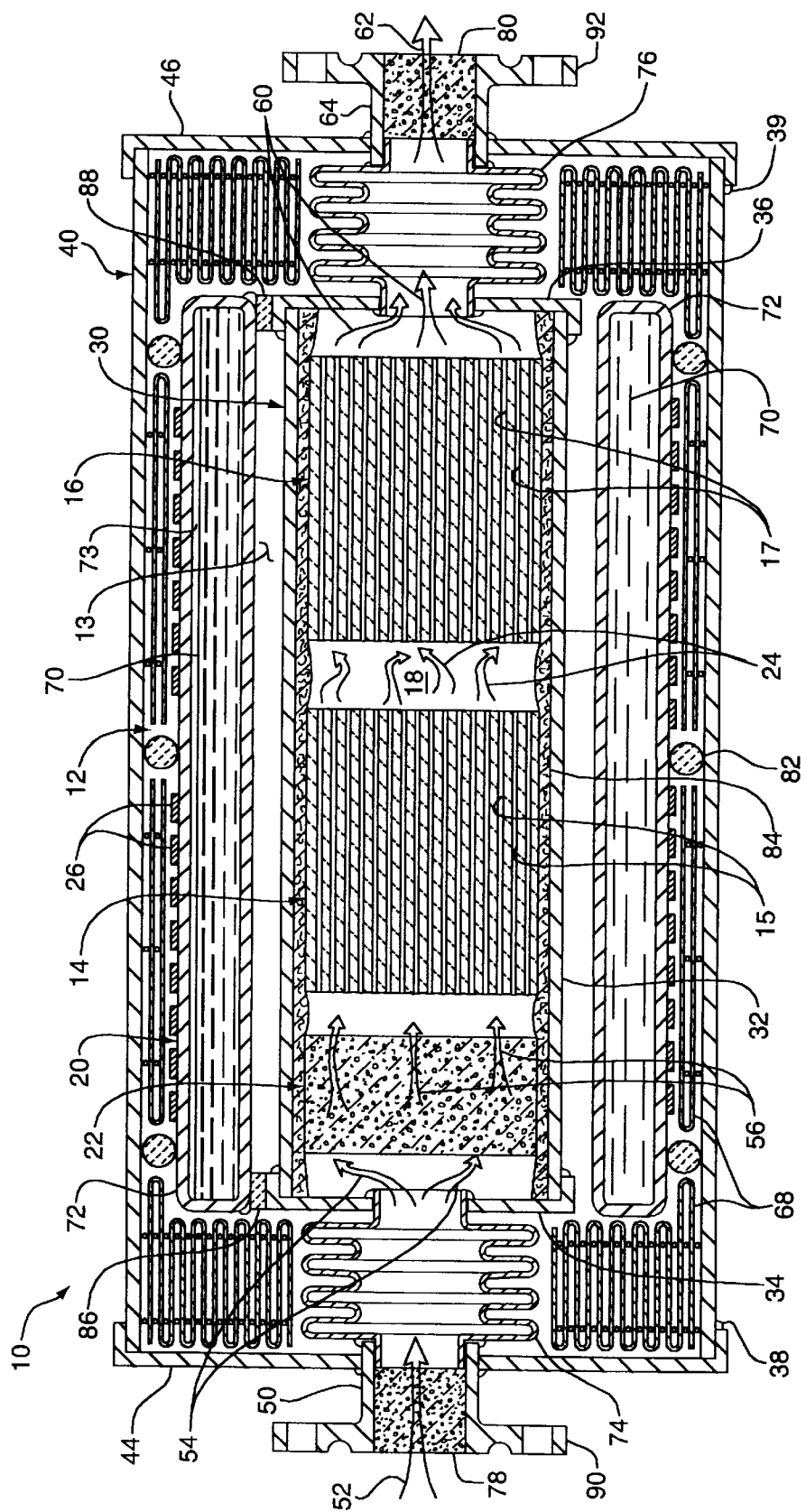
FIG. 4 is a longitudinal cross-sectional view of the improved vacuum insulated catalytic converter according to this invention taken along section line 4—4 of FIG. 3.
Figure 5:
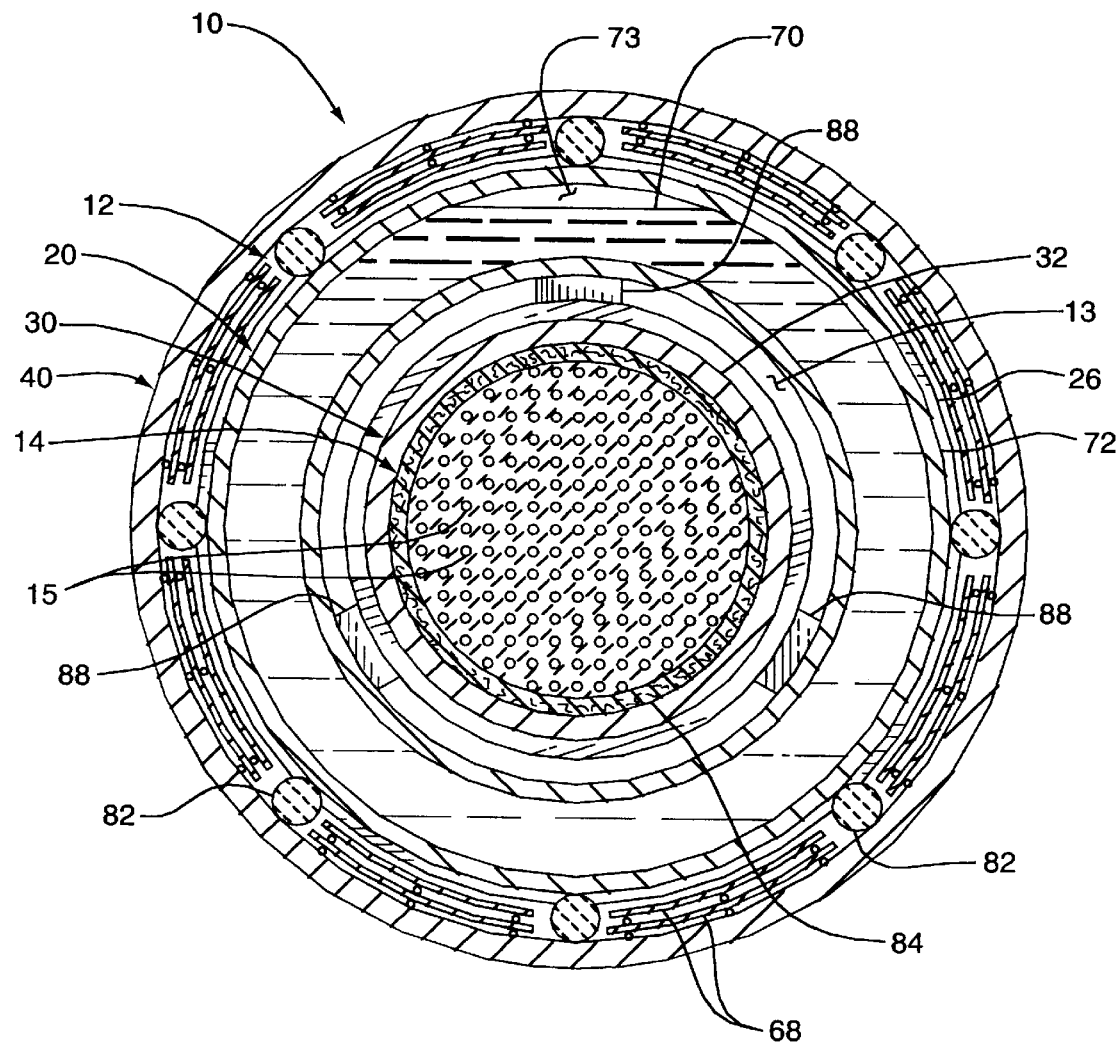
FIG. 5 is a transverse cross-sectional view of the improved vacuum insulated catalytic converter according to this invention taken along section line 5—5 of FIG. 2.

Referring now to FIGS. 4 and 5, a principle feature of the improved vacuum insulated catalytic converter 10 according to this invention includes a vacuum insulation chamber 12 with an evacuated space 13 of the chamber 12 extending between 3-way catalyst substrates 14, 16 and the heat storage structure 20, so that heat transfer between the catalyst substrates 14, 16 and the heat storage structure 20 during initial warm-up from a "cold start" can occur primarily by radiation across the evacuated space 13 rather than by conduction. Heat transfer by radiation is not very effective at low temperatures. Therefore, this feature keeps heat transfer from the catalyst substrates 14, 16 to the heat storage structure 20 during warm-up to a minimum while retaining more heat in the catalyst substrates 14, 16, which shortens the time it takes to heat the catalysts to light-off temperature after cold starts, as will be described in more detail below. A zeolite trap 22 is also included to absorb and retain exhaust gases, especially hydrocarbons in exhaust gases, during cold starts until after the catalyst substrates 14, 16 reach light off temperature. Then, when the catalyst substrates 14, 16 become hot enough to treat the exhaust gases effectively, e.g., above light-off temperature and preferably near normal operating temperature, the zeolite trap 22 releases the exhaust gases to flow through the catalyst substrates 14, 16, where they are treated by the catalysts before discharging them into the tail pipe T. The vacuum insulation chamber 12 is controlled to increase and decrease thermal conductivity according to this invention by passively activated hydrogen storage materials 26, which eliminates complex and unreliable electric wiring and components. These and other features of the invention will be described in more detail below.

In general, exhaust gases from the engine E (FIG. 1) enter the catalytic converter 10 through an inlet fitting 50, as indicated by flow arrow 52 in FIG. 4. Upon entering an internal canister 30, which contains the catalyst coated substrates 14, 16, the exhaust gases are first dispersed as indicated by flow arrows 54 to flow through pores or channels in the zeolite trap 22 as indicated by flow arrows 56, which absorbs and retains hydrocarbons as well as some of the carbon monoxide and nitrogen oxides from the exhaust gases when it is cold and releases them when it is hot. The exhaust gases then flow through catalyst coated pores and channels 15 in the first catalyst substrate 14 and through catalyst coated pores and channels 17 in the second catalyst substrate 16, where the carbon monoxide is oxidized to carbon dioxide, the hydrocarbons are oxidized to carbon dioxide and water, and the nitrogen oxides are reduced to nitrogen and oxygen, but only when the catalysts are hot. Therefore, the zeolite trap 22 and the catalyst coated substrates 14, 16 compliment each other to remove hydrocarbons and, to a somewhat lesser extent, the carbon monoxides and nitrogen oxides from the exhaust gases, both when the catalytic converter 10 is cold and when it is hot.

Immediately after a "cold start" of the engine, when the catalyst coated substrates 14, 16 are still too cool to catalyze the oxidation reaction necessary to convert uncombusted hydrocarbons in the exhaust gases to carbon dioxide and water, the cold zeolite trap 22 absorbs and retains the hydrocarbons. In the meantime, the heat in the exhaust gases along with concomitant exothermic heat from increasing catalytic reactions in the catalyst coated substrates 14, 16 heat the catalyst coated substrates 14, 16 to a proper operating temperature range (e.g., above about 350° C. (800° F.) and preferably about 550°–750° C. (1,000°–1,400° F.), where oxidation of hydrocarbons to carbon dioxide and water is catalyzed efficiently. With proper spacing, the exothermic heat from the catalytic reactions along with heat in the exhaust gases then also heat up the zeolite trap 22, which, when hot (e.g. in a range of about 350°–750° C.), releases the previously absorbed hydrocarbons back into the exhaust gases. Such released hydrocarbons then flow out of the Zeolite trap 22 and into the hot catalyst coated substrates 14, 16 to be reacted into carbon dioxide and water. The spacing between the catalyst substrate 14 and the zeolite trap 22 should be set to provide a suitable delay in time between the catalyst heat-up and the zeolite heat up so that the catalyst reaches or is close to its operating temperature before the zeolite desorb the hydrocarbons back into the exhaust stream to be reacted with the catalyst. The reacted exhaust gases then flow out of the catalytic converter 10 as indicated by flow arrows 60, 62 through an outlet fitting 64.

The vacuum insulation chamber 12 surrounding the internal canister 30 that contains the catalyst coated substrates 14, 16 initially confines the exhaust heat and the exothermic heat from the catalytic reactions in the catalyst coated substrates 14, 16 to the internal canister 30. The highly evacuated chamber 12 does not conduct heat away from the internal canister 30, and radiation heat transfer is insignificant at low temperatures. The metal bellows 74, 76 thin metal wall curvatures provide a resistance to heat flow, and the supports 86, 88 are made of a low thermal conductivity material. Therefore, the catalyst coated substrates 14, 16 inside the internal canister 30 heat up to light-off temperature and then to a proper operating temperature range quickly after "cold starts". However, as the proper operating temperature range is approached, more and more heat transfers primarily by radiation across the evacuated space 13 in the vacuum chamber 12 between the internal canister 30 and the heat storage structure 20, which begins to heat-up the heat storage structure 20. Then, after the heat storage structure 20 is heated to a sufficiently high temperature by such radiation heat transfer, for example near or to the preferred operating temperature range of about 500°–750° C. (1,000°–1,400° F.), one or more metal hydride strips or hydrogen storage material 26 on a surface of the heat storage structure 20, preferably, but not necessarily, opposite from the internal canister 30, release absorbed hydrogen gas into the vacuum insulation chamber 12 to facilitate heat transfer by gas molecular conduction from the internal canister 30 to the heat storage structure 20 and to the external shell canister 40. Heat transferred to the heat storage structure 20 is stored for later use in maintaining temperature of the catalyst-coated substrates 14, 16 above the light-off temperature for extended periods of time while the engine E is not operating. Heat transferred to the external shell canister 40 is dissipated to the environment to prevent the catalytic converter IO from over heating and damaging components, especially, but not exclusively, the catalysts and the heat storage structure, during normal operation.

After the engine E is turned off, the catalyst-coated substrates 14, 16 and the heat storage structure 20 begin to cool, and the temperature of the metal hydride strips 26 decreases. The metal hydride 26 is selected with characteristics that reabsorb the hydrogen gas in the vacuum insulation chamber 12 whenever its temperature decreases to a level below the normal operating temperature range to eliminate heat transfer by gas conduction, so that very little residual heat in either the catalyst-coated substrates 14, 16 or the heat storage structure 20 reaches the outer shell canister 40 to be lost to the environment. Metal foil radiation shields 68 positioned between the heat storage structure 20 and the outer shell canister 40 also minimize heat transfer by radiation from either the heat storage structure 20 or the catalyst-coated substrates 14, 16 to the outside shell canister 40. Therefore, the primary heat transfer mode during cool down periods after the engine E has been turned off is by radiation across the vacuum space 13 from the heat storage structure 20 to the internal canister 30, which contains the catalyst-coated substrates 14, 16 in order to maintain the temperature of the catalyst-coated substrates 14, 16 above the light-off temperature as long as possible.

Thin metal bellows 74, 76 are used to connect the inlet fitting 50 and the outlet fitting 64 to opposite ends 34, 36, respectively, of the internal canister 30 to minimize heat conduction from the internal canister 30 to the outside shell canister 40 and to the exhaust pipe P and tail pipe T. Porous ceramic inserts 78, 80 or other porous material with low modulus of thermal conductivity are positioned in inlet fitting 50 and outlet fitting 64, respectively, to block radiation heat transfer from the internal canister 30, catalyst-coated substrates 14, 16, and zeolite trap 22 to the exhaust pipe P and tail pipe T. Low heat conductive spherical spacers 82, such as ceramic or glass beads, are used to minimize conduction heat transfer from the heat storage structure 20 to the outside shell canister 40.

The heat storage structure 20 preferably, but not necessarily, includes a phase change material (PCM) 70, which can be contained in an annular tank 72 around the internal canister 30. The PCM 70 is preferably selected or designed to have a melting/freezing temperature above the light-off temperature of the catalyst, but below the normal operating temperature range of the catalytic converter 10. Therefore, as the engine E and catalytic converter 10 operate in the normal operating temperature range, the temperature of the PCM is high enough to be melted into its liquid phase, thus storing a substantial heat of fusion. When the engine E is turned off and no more heat is being created in the catalytic converter 10, initial cooling of the PCM 70 is in a sensible manner as heat transfers by radiation from the PCM 70 to the internal canister 30 to help maintain catalyst-coated substrates 14, 16 above light-off temperature. However, when the temperature of the PCM 70 cools down to its freezing/melting temperature, for example, but not for limitation, in a range of about 250° C.–550° C., the temperature of the PCM 70 will stay constant at such freezing/melting temperature for an extended period of time as the PCM 70 gives up its heat of fusion to the catalyst-coated substrates 14, 16. Consequently, when the PCM 70 has a freezing/melting point above the light-off temperature of the catalyst, as described above, the PCM 70 helps to maintain the catalyst-coated substrates 14, 16 above the light-off temperature for extended periods of time. Aluminum and aluminum alloys, such as AlSi, are several of myriad phase change materials that are appropriate for purposes described above. As new catalytic converts with even lower light-off temperatures are developed, phase change materials with correspondingly lower freezing/melting temperatures can be used according to this invention. The tank 72 is preferably not filled completely full of the PCM 70, so that some room 73 in the tank 72 is available for expansion of the PCM 70 as it is heated.

Additional structural and functional details of the preferred embodiment catalytic converters are described below. However, structures, materials, and functions of many components and features of the catalytic converter 10, including, but not limited to, catalyst-coated substrates, variable vacuum insulation, phase change materials, bellows connectors, and radiation heat transfer shields, can be found in the following U.S. Pat. Nos., all of which are incorporated herein by reference and made a part hereof: 5,477,676, 5,318,108, 5,175,975, 4,572,864, 4,702,853, and 4,860,729. The following publications also contain helpful information relating to some components and designs used to implement the catalytic converter 10 and are incorporated herein by reference and made a part hereof: *Keeping the Heat on Cold-Start Emissions*, National Renewable Energy Laboratory, May 1996; *Reducing Cold-Start Emissions by Catalytic Converter Thermal Management*, National Renewable Energy Laboratory; *Applications and Benefits of Catalytic Converter Thermal Management*, National Renewable Energy Laboratory; *Thermal Analysis and Testing of a Vacuum Insulated Catalytic Converter*, National Renewable Energy Laboratory.

Continuing now with primary reference to FIG. 4, the catalysts, for example, platinum, palladium, rhodium, and/or other catalytic materials are coated on external and internal surfaces of catalyst substrates 14, 16, which can be ceramic or other material that is capable of withstanding and maintaining structural integrity in the high temperature range of about 550° to 750° C. (1,000° to 1,400° F.) in which catalytic converters operate. The catalyst substrates 14, 16 may have channels 15, 17 extending through them to provide internal surface area for catalyst coatings and to conduct exhaust gases through the catalyst substrates 14, 16 in contact with the catalyst coatings. The invention would work with a single catalyst substrate, but, when the catalytic converter 10 is an elongated structure, it is preferable to provide several (two or more) smaller catalyst substrates 14, 16 separated by space(s) 18 between them to cause further mixing of the exhaust gases, as indicated by flow arrows 24 mid-way through the catalytic converter 10. Such mixing distributes heat and exhaust gas content more uniformly, which enhances converter operating efficiency.

The internal canister 30 can be constructed in any convenient manner structure, and shape, but, for convenience, it is illustrated here in the form of a cylindrical wall section 32 enclosed at opposite ends by a front end cap 34 and a rear end cap 36. The end caps 34, 36 can be fastened in place in any convenient manner, but steel for the cylindrical wall section 32 and for the front and rear end caps 34, 36 with welding 38, 39 is preferred, because welded steel holds a vacuum seal and does not out gas, which could be detrimental to the vacuum in vacuum insulation chamber 12. It also accommodates relative ease of manufacture in that the catalyst substrates 14, 16 as well as other components, which will be described in more detail below, can be positioned inside the cylindrical wall section 32 prior to welding one or both of the end caps 34, 36 in place. Therefore, use of the term "canister" for either the inner canister 30 or the external canister 40 is only for convenience and is not intended to have any special or limiting meaning or connotation. Any structure that encloses interior spaces or chambers for the purposes described in this patent application would suffice.

The internal canister 30 is positioned concentrically inside an elongated outer cylindrical canister 40, which can be made of any number of materials and structures, is also preferably made of a steel cylindrical side wall portion with steel end caps 44, 46 welded in place for the same reason described above for the inner canister 30, as well as to provide a sturdy shell for containing and protecting the components positioned inside it, as will be described in more detail below.

The zeolite trap 22 can be, for example, molecular sieve, which is available from Grace Davidson Division of W.R. Grace & Co., of Boca Raton, Fla. The thermal connection between the catalyst-coated substrate 14 and the zeolite trap 22, including, but not limited to, the width of the space 19 between the substrate 14 and the zeolite trap 22, should be such that the zeolite trap 22 is heated by the hot catalyst-coated substrate to release absorbed hydrocarbons, but only when the temperature of the catalyst is in a proper operating range, such as 550° to 750° C. (1,000° to 1,400° F.), and usually closer to about 650° C. (1,200° F.).

The catalyst-coated substrates 14, 16 and zeolite trap 22 can be mounted and held in place in the internal canister 30 by wrapping them in a layer of an intumescent paper 84, which expands when heated, and slid into the cylindrical wall section 32 prior to welding one of the end caps 34, 36 in place. When the canister 30 and paper 84 is heated, the paper 84 expands and irreversibly fixes the substrates 14, 16 and zeolite trap 22 in place. The intumescent paper 84 also has a lower coefficient of thermal conductivity than the steel cylindrical wall section 32, so it limits heat conduction from the catalytic substrate 14, 16 to the Zeolite trap 22. A suitable intumescent paper 84 for this purpose is "XPE"™ available from Carborundum Corporation of Amherst, N.Y.

The internal canister 30 is supported by low thermal conductance spacers or supports 86, 88 so that the primary heat transfer mode between the internal canister 30 and the heat storage structure 20 is radiation across vacuum space 13, as described above. The vacuum insulation chamber 12 is preferably evacuated to a range of about $10^{-3}$ to $10^{-6}$ torr for a highly effective vacuum insulating effect against gas conductive heat transfer. The distance of space 13 between the internal canister 30 and the heat storage structure 20 should be sufficient to prevent significant heat drain from the catalyst-coated substrates 14, 16 to the cold heat storage structure 20 until the catalyst-coated substrates 14, 16 reach their operating temperature range of about 550° to 750° C. (1,000° to 1,400° F.), but not so large as to prevent the heat storage structure 20 and the metal hydride strips 26 mounted on the heat storage structure 20 from being heated to a high enough temperature to release hydrogen into the vacuum insulation chamber 12 when the catalyst-coated substrates 14, 16 reach their proper operating temperature range. The radiative power transfer Q in watts is given by:

$$Q = A_2 \sigma \epsilon_{23} [T_4^2 - T_3^4], \quad (1)$$

where subscript 2 refers to the internal canister 30, the subscript 3 refers to the PCM tank 72, $A_2$ is the surface area of the canister 30, $\sigma$ is the Stefan-Boltzman constant, and $\epsilon_{23}$ is the effective emittance between surfaces of 2 and 3, $$\varepsilon_{23} \approx \left[\frac{1}{\varepsilon_2} - 1 + \frac{1}{\varepsilon_3}\right]^{-1} \quad (2)$$

and $T_2$ and $T_3$ are absolute temperatures of the two surfaces of 2 and 3. The thermal resistance $R_{TH}$ in °K/Watt between these two surfaces of 2 and 3 is given by $$R_{TH} = \frac{T_2 - T_3}{Q} = \{A_2 \sigma \varepsilon_{23} [T_2^2 + T_3^2] [T_2 + T_3]\}^{-1}, \quad (3)$$

so $R_{TH}$ decreases rapidly as temperature $T_2$ or $T_3$ increases.

Figure 6:
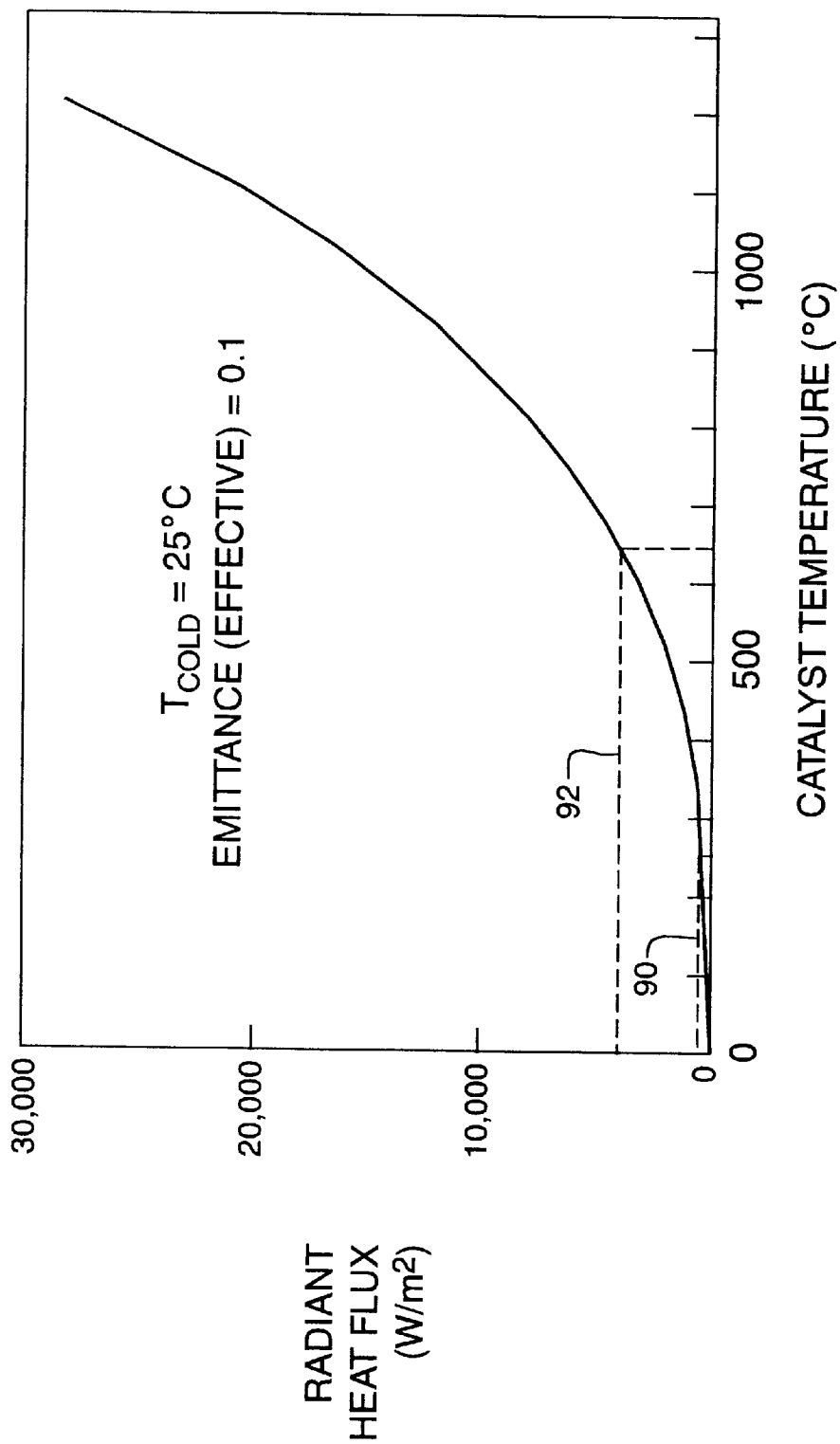
FIG. 6 is a graph showing the relationship of radiative thermal coupling between the catalyst and the heat storage structure to temperature of the catalyst.

The graph in FIG. 6 illustrates this relationship in which radiation thermal coupling between the catalyst (essentially the internal canister 30 containing the catalyst-coated substrates 14, 16) and the heat storage structure 20 is strongly temperature dependent. Radiant heat flux is a function of the catalyst temperature cubed (Flux $\alpha$ $T^3$). When the catalyst is heated to light-off temperature in the range of about 250° to 300° C. (480° to 570° F.), the radiant heat flux 90 (in watts per square meter), i.e., heat transfer from the catalyst by radiation, is still relatively small, about 750 W/M². Therefore, there is very little heat transfer from the catalyst to the heat storage structure 20 as the catalyst is being heated by exhaust gases and exothermic reactions to light-off temperature. As the catalyst temperature rises above light-off temperature, the radiant heat flux increases. In the normal operating range of 550° to 750° C., preferably about 650° C., as shown in FIG. 6, the radiant heat flux 92 is substantially greater at about 4,000 W/M², i.e., approximately five times higher than at light-off temperature. This higher radiative heat transfer rate as temperature of the catalyst approaches the operating temperature is sufficient to heat the heat storage structure 20 and the metal hydride getter material 26 to a temperature that causes the metal hydride getter material 26 to desorb enough hydrogen gas into the vacuum insulated chamber 12 to supplement the radiative heat transfer from the catalyst, i.e., the internal canister 30, with gas conductive heat transfer to keep the catalyst-coated substrates from over heating, as described above. Consequently, as the catalyst heats up, there will be little heat drain to the cold PCM 70 of heat storage structure 20 until that catalyst reaches a proper operating temperature.

Although it is not shown in FIG. 6, additional radiation shields 68 could be positioned in the space 13 to slow down radiation heat transfer from the catalyst to the heat storage structure 20. On the other hand, additional reversible hydride getter strips 26 could be positioned on the exterior surface of internal canister 30 to release hydrogen as the canister 30 heats up in order to speed up heat transfer from the catalyst to the heat storage structure 20.

The metal hydride 26 can be a reversible hydrogen getter (RHG), such as Fe/Al/Zr alloy hydride, which is available from SAES Getters of Colorado Springs, Colo., in a product known as ST707 strip. The hydrogen pressure $P_{HZ}$ in equilibrium with the RHG is given by $$P_{H2} \approx AX^2 \exp\left(\frac{-\Delta E}{KT}\right) \quad (4)$$

where A is a proportionality constant, X is the concentration of hydrogen absorbed in the RHG, $\Delta E$ is an activation energy for binding the hydrogen in the RHG and is a characteristic of the metal alloy of the RHG, K is the Boltzmann's constant, and T is the absolute temperature of the RHG.

Figure 7:
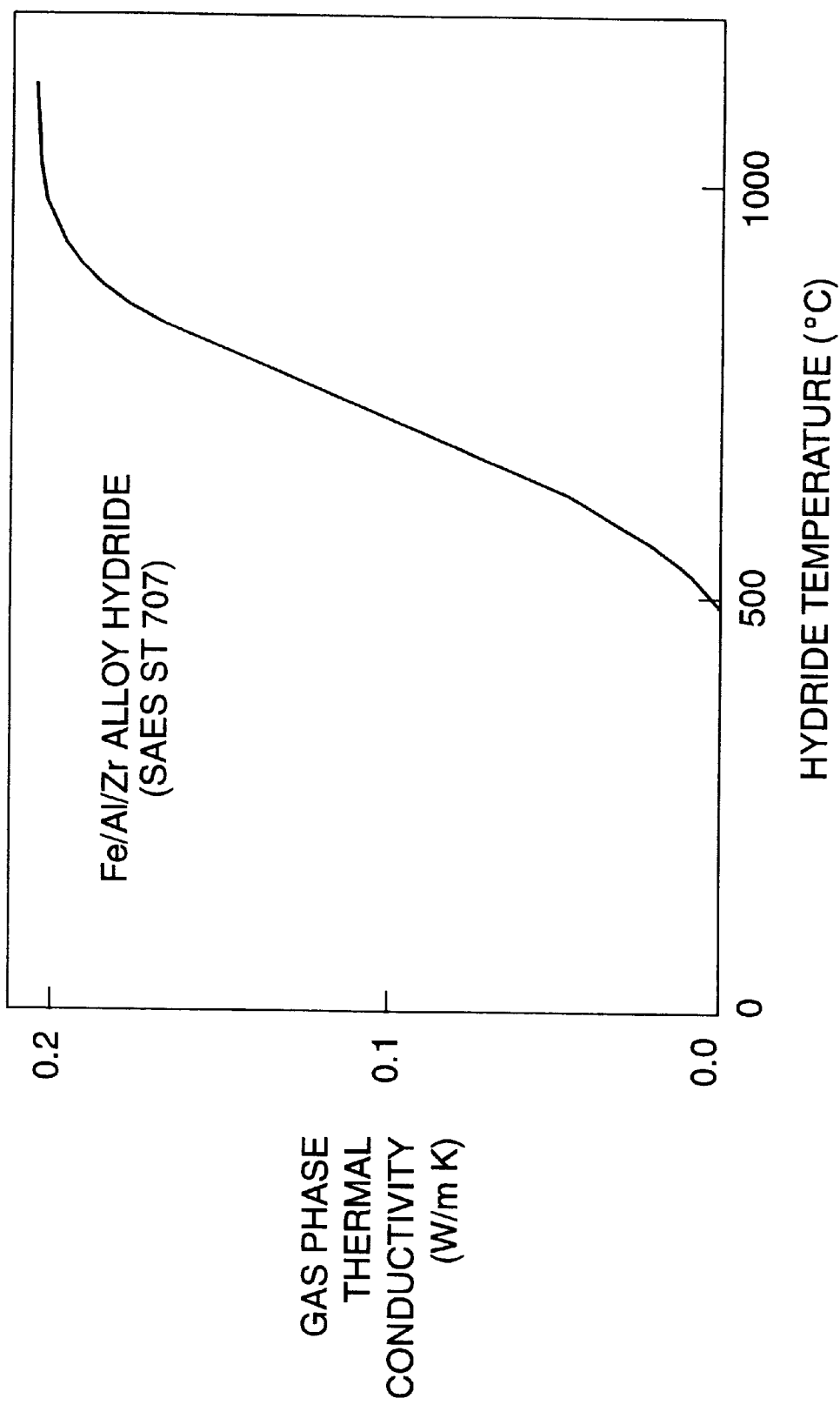
FIG. 7 is a graph showing the relationship of gas phase thermal conductivity of the vacuum insulated chamber to the temperature of the metal hydride getter material.

The thermal conductance of the hydrogen gas released by the RHG is approximately proportional to $P_{H2}$ so that the conductance through the vacuum insulation chamber 12 to the outer shell canister 40 and to the ambient increases exponentially with temperature, as illustrated by the graph in FIG. 7. Therefore by selecting the amount of RHG 26 and the concentration of absorbed hydrogen, X, carefully, the catalyst and the PCM can be prevented from overheating by releasing enough hydrogen at proper catalyst operating temperature (about 550° to 750° C.) (1,000° to 1,400° F.) into the vacuum insulation chamber 12 to conduct enough heat away from the catalyst-coated substrates 14, 16 to the outer shell canister 40 to prevent temperature of the catalyst from rising above the proper operating range.

The vacuum insulation chamber 12 is preferably enclosed entirely by metal components welded together, and all components in the chamber 12 are preferably made of metal, ceramic, glass, or other materials that have little or no out-gassing effect in the $10^{-3}$ to $10^{-6}$ Torr vacuum in the chamber 12.

The inlet fitting 50 and outlet fitting 64 can include respective flanges 90, 92 for connecting the catalytic converter 10 to the exhaust pipe P and the tail pipe T, although other connections, such as clamps, welding, or other well-known connectors could also be used.

The foregoing description is considered as illustrative only of the principles of the invention. Furthermore, since a number modifications and changes will readily occur to those skilled in the art, it is not desired to limit the invention to the exact construction and process shown described above. For example, but not for limitation, the inner and outer cannister structure with annular vacuum insulation space and annular phase-change material in circular cross-section structure is convenient and efficient, but other structural arrangements, such as oval or rectangular cross-section, or eccentric mountings of the canisters and phase-change material, or even one side, such as either the top or the bottom, permanently insulated so that heat can only dissipate through the other side and with placement of the vacuum chamber, phase-change material, and reversible hydrogen getter on such other side for controlling such heat dissipation. Accordingly, all suitable modifications and equivalents may be resorted to falling within the scope of the invention as defined by the claims which follow.

What is claimed is:

1. Catalytic converter apparatus, comprising:
   an outer canister;
   an inner canister positioned inside the outer canister in a manner that leaves an annular chamber between the inner canister and the outer canister, said inner canister having inner canister walls that enclose an interior chamber inside said inner canister and that seal said interior chamber from said annular chamber, said outer canister having outer canister walls that seal said annular chamber in a manner that allows said annular chamber to be evacuated, and said inner canister having an inlet opening extending from outside of the outer canister into the interior chamber and an outlet opening extending from the interior chamber to outside of the outer canister for conducting exhaust gases into and out of the interior chamber;
   a catalyst-coated substrate positioned in said interior chamber, said catalyst substrate having pores or channels through which exhaust gases can flow and surfaces coated with catalyst that catalyzes reactions of chemical substances in exhaust gases;
   a heat storage structure positioned in said annular chamber a distance spaced apart from the inner canister, wherein the distance is sufficient to prevent significant heat drain from the catalyst-coated substrate to the heat storage structure until the catalyst-coated substrate reaches its operating temperature; and
   a reversible hydrogen getter positioned in said annular chamber.

2. The catalytic converter of claim 1, wherein said reversible hydrogen getter is positioned at a distance spaced apart from the inner canister.

3. The catalytic converter of claim 1, wherein said reversible hydrogen getter is positioned on a surface of said heat storage structure.

4. The catalytic converter of claim 1, wherein said heat storage structure comprises a tank containing a phase-change material.

5. The catalytic converter of claim 4, wherein said catalyst has an operating temperature range and said phase-change material has a freezing/melting temperature that is lower than the operating temperature range.

6. The catalytic converter of claim 4, wherein said catalyst has a light-off temperature and said phase-change material has a freezing/melting temperature that is higher than the light-off temperature.

7. The catalytic converter of claim 4, wherein said catalyst has an operating temperature range and a light-off temperature that is lower than the operating temperature range, and wherein said phase-change material has a freezing/melting temperature that is lower than the operating temperature range and higher than the light-off temperature.

8. The catalytic converter of claim 4, wherein said tank is an annular container positioned around said inner canister.

9. The catalytic converter of claim 4, wherein said phase-change material comprises aluminum.

10. The catalytic converter of claim 9, wherein said phase-change material comprises aluminum alloy.

11. The catalytic converter of claim 10, wherein said aluminum alloy is AlSi.

12. The catalytic converter of claim 1, including a zeolite trap positioned in said inner canister between said inlet opening and said catalyst coated substrate.

13. The catalytic converter of claim 12, wherein said zeolite trap has a plurality of pores or channels that accommodate flow of exhaust gases through the zeolite trap.

14. The catalytic converter of claim 12, wherein said zeolite trap is positioned at a distance spaced apart from said catalyst-coated substrate.

15. The catalytic converter of claim 1, including a layer of intumescent paper between the catalyst-coated substrate and the inner canister wall.

16. The catalytic converter of claim 12, including a layer of intumescent paper between the zeolite trap and the inner canister wall.

* * * * *